Patented Dec. 7, 1948

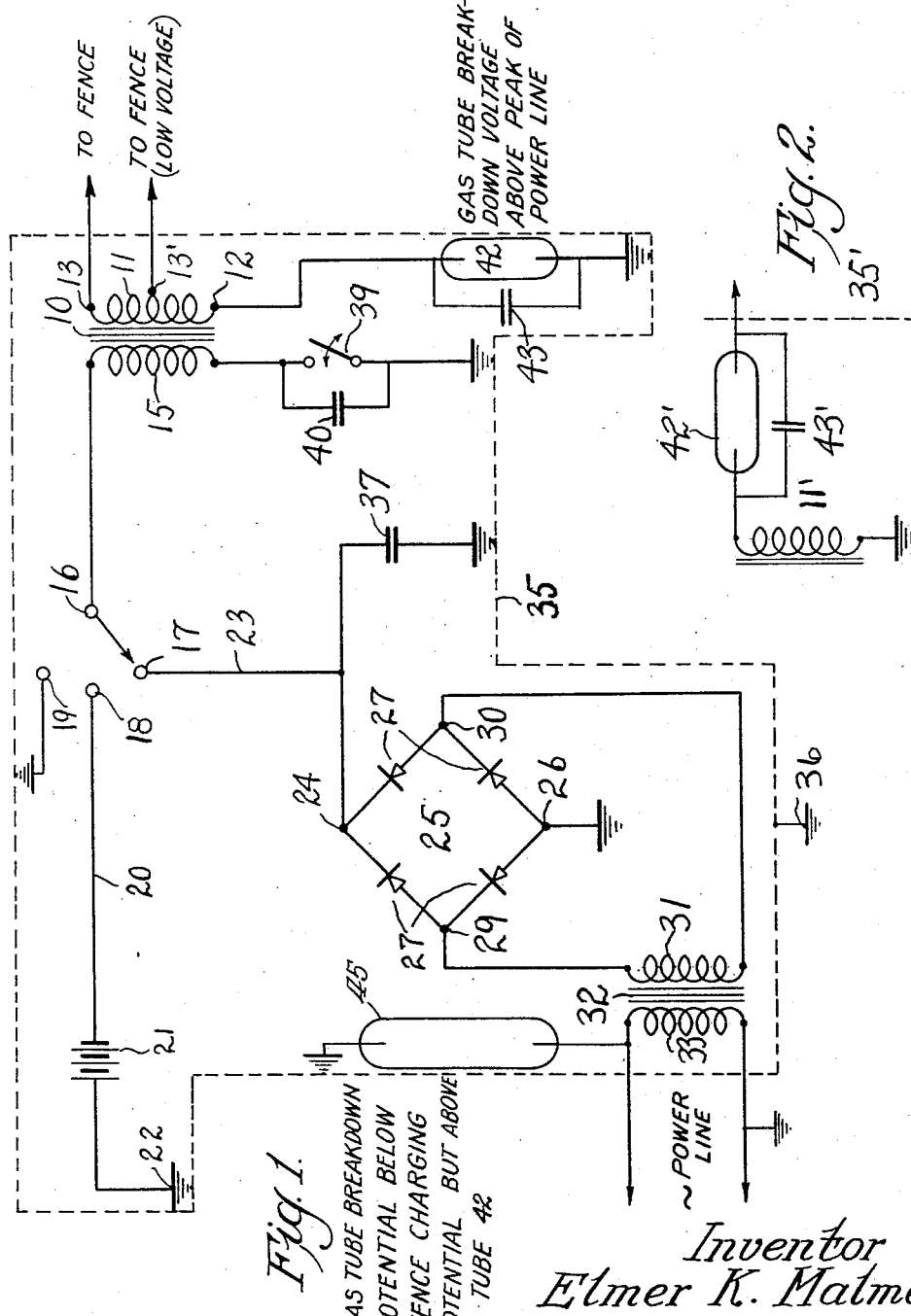

2,455,511

UNITED STATES PATENT OFFICE 2,455,511

ELECTRICAL FENCE CHARGER

Elmer K. Malme, Chicago, Ill., assignor to Guard-It Manufacturing Co., Chicago, Ill., a corporation of Illinois Application December 10, 1945, Serial No. 634,060

3 Claims. (Cl. 171—97)

This invention relates to an electrical apparatus and particularly to an electric fence charging system. Electric fence chargers for periodically impressing a high potential on wire fences are well known in the art. Such chargers comprise a step-up transformer and means for periodically closing the transformer primary circuit. The secondary may furnish as much as 3000 volts and is connected between ground and the fence to be charged. The primary of the transformer is generally adapted to be energized by some low voltage such as six volts. Included as part of the unit is a supply transformer, rectifier and condenser which may be used to supply six volts direct current to the primary of the step-up transformer if a power circuit such as 110 volt, 60 cycle is available. In the absence of such a power line connection, a six volt battery may be used as the energizing source.

It is understood that the six volts is merely exemplary, and the voltage may have other values as desired. In any event, fence chargers are customarily made to be energized from an alternating current power line or local batteries. The entire charger is disposed in a metal case with the case itself acting as a ground for the charger system and being grounded to earth to provide a through circuit for the high voltage.

When a fence charger is connected for operation to a power line, it is possible that, in the course of time, the insulation will become defective. Under such conditions, a through circuit between the 110 volt power line and fence to be charged may be established. While the voltage normally impressed on a charged fence may be of the order of 3000 volts, the charger is normally incapable of providing any current of substantial magnitude. Fence chargers generally operate with currents with instantaneous peaks from 100 to 500 milliamperes and average current of the order of around 10 milliamperes. In the event that a power line becomes connected to a fence through a defect in the insulation of the fence charger apparatus, a dangerous condition may be created.

It is customary to dispose the entire fence charger unit in a metal case, which case is the ground for the charger circuit components. However, to complete the entire fence charger circuit, a real ground from the metallic casing to earth is necessary. It may occur that the ground between the metallic casing and earth becomes disconnected or has a high resistance. In such a case and assuming that a low resistance from fence to earth is present, a substantial portion of the fence charger potential will be impressed across the insulation of the transformer connected to the power line. This arises out of the fact that the power lines generally have one side grounded.

In accordance with this invention, a device having a high potential break-down characteristic well below the potentials used for charging a fence but well above any power line potential is connected between the power line supply transformer and the casing.

Also, in accordance with this invention, means are provided whereby any continuous metallic connection between the power line and the output of the charger going to the fence is rendered impossible. In general, the invention contemplates the disposition in a portion of the output circuit of the charger of a device having a low potential break-down characteristic in excess of any normal power line potential. Such device may consist simply of a gaseous discharge glow lamp or tube having a break-down potential in excess of any normal peak potential encountered in the power line but well below any fence charging potential. Thus, as an example, if a 110 volt power line is used to supply the fence charger, then the gaseous discharge device may be so designed as to break down at a voltage of about 180 volts.

Inasmuch as the normal charging potential for the fence is well above this voltage, it follows that the electric circuit for charging the fence will be substantially unimpaired. Because of the resistance in the fence charging circuit presented by the fence and ground, a gaseous discharge device having a break-down potential of around 180 will never have sufficient potential available across the discharge device to maintain a discharge even if such a discharge is initiated by a high potential fence charging pulse. This is for a 110 volt power line. For other power line voltages, different potential break-down values would be necessary.

A low potential gaseous discharge device, in addition to providing the selective voltage break-down action, may also be used as a visual indicating means to show that the charger system is operating properly. Thus, every time a high voltage fence charger pulse occurs, a flash of light will be emitted by the lamp. It is possible to mount the lamp in the casing in such a manner that a window will permit the flash to be visible from the outside.

A further advantage resides in the use of a low potential gaseous discharge tube in the high voltage secondary circuit. As is well known, a glow tube has the property of tending to maintain a constant voltage across its terminals. This property is utilized to reduce ripples in the high voltage circuit due to ripples in the rectifier output.

A low potential gaseous discharge device may be conveniently disposed in one of the terminals of the secondary winding of the high voltage transformer. Inasmuch as this transformer is normally connected between the casing, which is to be grounded, and the fence, it is possible to dispose the low potential gaseous discharge device either in the lead extending from the transformer secondary and the fence or the lead extending from the transformer secondary to the casing, which in this particular system would represent the ground.

For a more complete description of the invention, reference will now be made to the drawing wherein exemplary embodiments of the invention are disclosed, it being understood that the invention itself is susceptible to various modifications.

Figure 1 shows a circuit diagram of a charging system embodying the present invention with the metallic casing shown in dotted outline.

Figure 2 shows the secondary circuit of the high voltage transformer and illustrates a modified form of the invention.

Referring now to the drawing, high voltage transformer 10 is provided with secondary 11 having leads 12 and 13. These leads are taken at opposite ends of secondary winding 11 and normally represent the low and high potential terminals of the winding respectively. Lead 13' may be taken at an intermediate point in secondary 11 to provide a lower fence charging voltage.

Transformer 10 has primary 15, one terminal of which goes to rotary switch 16 having contacts 17, 18 and 19 respectively. As is evident, contact 19 is an off contact and is grounded. Contact 18 may be connected by wire 20 to battery 21 having one terminal grounded at 22 if battery operation is to be desired.

Contact 17 may be used when power line operation of the charger is desired. To this end, contact 17 is connected by wire 23 to terminal 24 of rectifier system 25 having its other terminal 26 grounded. Rectifier system 25 may be any type desired and is here shown as of the bridge type having rectifier elements 27. Any full wave type is preferred because of the smoother output. Each rectifier element may be of any type. Thus, a simple rectifying system utilizing copper oxide or selenium rectifiers are available on the market. Bridge system 25 has input terminals 29 and 30 to which may be connected secondary 31 of power transformer 32. Power transformer 32 has primary 35 for connection to any suitable power line such as the 110 volt 60 cycle generally available. The grounds in the various instances represent a connection to a metallic casing enclosing the entire apparatus and generally indicated by numeral 35. This casing itself may be grounded to the earth as shown at 36 to provide a fence charging terminal.

Output terminals 24 and 26 of bridge rectifier 25 are preferably connected to condenser 37 having a substantial capacitance. Other filtering means may be provided. Thus, condenser 37, as one example, may have a capacitance of several micro-farads. It has hitherto been customary to provide a capacitance of the order of several thousand micro-farads. It will be noted that a terminal of the rectifier and condenser are grounded to the casing.

Primary 15 of high voltage transformer 10 has one terminal connected by lead 38 to grounded interrupter switch 39. Switch 39 may be any one of a number of types of switches, which periodically open and close. Thus, the switch may cooperate with the core of transformer 10 to maintain the switch in continuous operation. Inasmuch as such switches are well known in the art, a detailed description thereof is deemed to be unnecessary. As a rule, such switches have as part thereof a spring which permits the switch to operate at a relatively low frequency of the order of about 30 to 60 cycles per minute. Switch 39 may be shunted by condenser 40 to reduce arcing at the contacts.

Connected in the output fence charging circuit, here shown between lead 12 and ground, is glow discharge lamp 42. Lamp 42 may be any one of a number of neon or other gas lamps, which are adapted to break down and initiate a glow discharge at a certain potential. Thus, if 110 volts is applied to the primary of the power transformer, gas tube 42 may be so designed as to break down at about 180 volts. The exact value is unimportant, since this is well above the normal peak in a 110 volt line. If a 220 volt line were used, lamp 42 would be so designed as to break down at around 360 volts. As a rule, the running voltage is less than the starting voltage. In all cases, it is preferred to have the running voltage of the lamp also well above any normal peak voltage in the power line.

Shunted across lamp 42 is condenser 43 having substantial capacitance. While this condenser is not essential, it does have a desirable action on the wave form of the output voltage. Thus, when the lamp breaks down and conducts, the condenser becomes charged. In practice, condenser 43 may have a capacitance of about .1 micro-farad. This value, however, is not critical and may be varied within wide limits or the condenser may be omitted.

The gas discharge lamp is preferably designed so that it may handle the current normally desired for charging the fence. Thus, the lamp may be designed so that it may readily pass a current with instantaneous peaks from 100 to 500 milliamperes without damage. It is well known that such lamps have no fixed current for operation, so that the current passing through it may vary over wide limits. However, the positive resistance of the charging circuit will keep the lamp current to a safe value.

If desired, lamp 42' may be disposed in lead 13 or 13', as shown in Figure 2, or lamps may be disposed in every one of the transformer leads.

It is clear that the high voltage secondary winding is connected in series to a gas tube between the casing and other fence charging terminal.

For protection against a bad ground between casing 35 and earth 36, high potential gas tube 45 may be disposed between one terminal of primary 33 and metallic casing 35. As shown here, one side of the power line is grounded. It is immaterial to which terminal of primary 33 tube 45 is connected. Tube 45 will break down and conduct at potentials somewhat below normal fence charger potentials generated by secondary 11 but of the same general order. Thus, if secondary 11 generates potentials of the order of around 3000 volts, tube 45 may break down at a potential of around 1000 volts or more.

In the event that the fence charger unit is operating and the ground between casing 35 and earth 36 is impaired, any high potential tending to break down the insulation of transformer 32 will be adequately handled by gas tube 45. In such case, a high potential circuit from terminal 13 (or 13') to a fence, then to earth, then through the power line to primary 33 through gas tube 45 and casing 35 may be traced. From casing 35, the circuit will continue through to terminal 12.

It will be evident that, with the power line grounded to the casing, the peak voltage present in the power line will be insufficient to break down the protective low potential lamp and complete a circuit through to the fence. When the low potential lamp is conducting in response to a high potential surge from transformer secondary 11, a connection from the power line to the fence is momentarily established. However, the through connection is promptly broken when the high potential surge has passed. Thus, momentary connections between the power line and the fence may exist under the worst conditions. Such momentary connections are not objectionable and will have little or no effect.

It has been found that the voltage regulating action of the low potential glow discharge tube permits condenser 37 to have substantially less capacitance than would normally be the case with no lamp and still provide an output charging voltage having a low percentage of ripple voltage.

In operation, interrupter 39 closes the primary circuit of high potential transformer 10 for a short time and keeps the circuit open for a much longer time. The interrupter cycle is much longer than any power cycle from the power line.

It is understood that, if battery operation is desired, the power line connection is not used. The battery may be disposed outside of casing 35.

What is claimed is:

1. A fence charger comprising voltage transformer means having an input winding for energization from an alternating current power line at normal potential for domestic use, said power line having one side thereof grounded, said transformer means having a high potential output winding for providing a fence charging potential of an order substantially greater than any normal power line potential, a casing including a metallic portion for enclosing said fence charger elements, said metallic portion constituting one fence charger terminal, a second fence charger terminal adapted to be connected to a fence to be charged, said metallic casing portion being adapted to be connected to earth for providing a return circuit for fence charging, and a gas tube connected between said input winding and said case, said gas tube being conducting for potentials below fence charging potentials but above any normal potential in the in-put winding whereby, if said connection between earth and said metallic casing becomes impaired, a fence charging circuit may be completed through said gas tube without impairing normal insulation.

2. The structure of claim 1 wherein a second gas tube is connected in series with the high potential output winding, said second gas tube being non-conducting at potentials larger than but of the same order as normal peak power line potentials but conducting at potentials in excess thereof, said second gas tube being adapted to become conducting at a potential substantially lower than the potential at which the first-named gas tube becomes conducting and wherein a condenser is shunted across said second gas tube.

3. The structure of claim 1 wherein a second gas tube is connected in series with the high potential output winding, said second gas tube being non-conducting at potentials larger than but of the same order as normal peak power line potentials but conducting at potentials in excess thereof, said second gas tube being adapted to become conducting at a potential substantially lower than the potential at which the first-named gas tube becomes conducting.

ELMER K. MALME.

REFERENCES CITED

The following references are of record in the file of this patent:

UNITED STATES PATENTS

| Number | Name | Date |
| --- | --- | --- |
| 2,090,199 | Heidger | Aug. 17, 1937 |
| 2,196,046 | Willis | Apr. 2, 1940 |
| 2,265,039 | Harder | Dec. 2, 1941 |
| 2,318,832 | Roach | May 11, 1943 |
| 2,415,944 | Fagen | Feb. 18, 1947 |